Oct. 21, 1930.                    A. LEVINE                    1,779,281
TOGGLE BRACE FOR HINGED MEMBERS
Filed Sept. 7, 1928
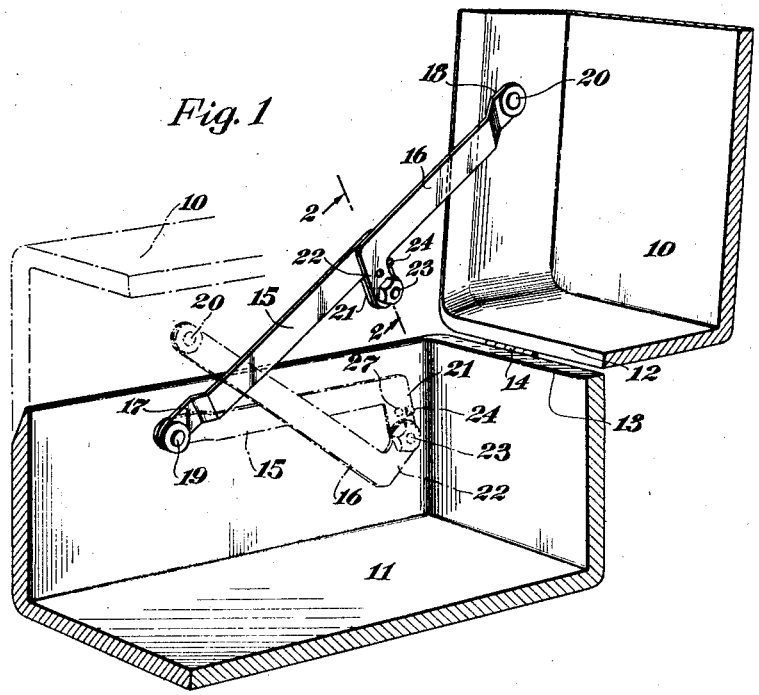
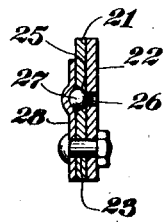
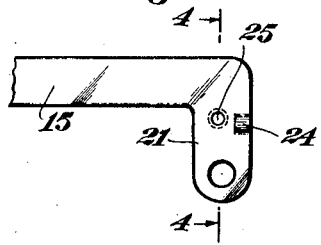
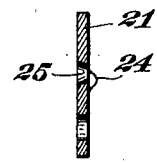
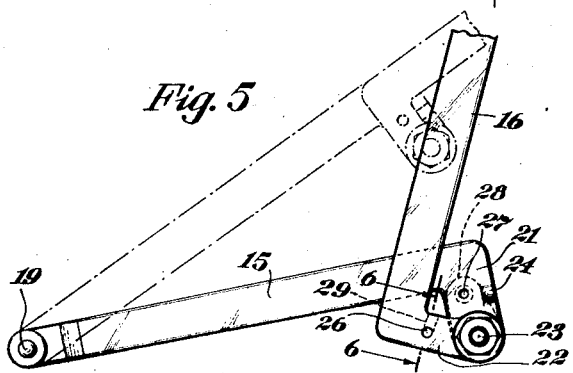
INVENTOR
Abraham Levine
BY
William S Gluck
ATTORNEY Patented Oct. 21, 1930

1,779,281

UNITED STATES PATENT OFFICE

ABRAHAM LEVINE, OF ELIZABETH, NEW JERSEY, ASSIGNOR TO PRESTO LOCK CORPORATION, OF NEW YORK, N. Y., A CORPORATION OF NEW YORK

TOGGLE BRACE FOR HINGED MEMBERS

Application filed September 7, 1928. Serial No. 304,601.

My present invention relates generally to bracing devices and has particular reference to a toggle brace for hinged members.

Although I have herein illustrated and shall hereinafter describe my invention as applied to the two mutually hinged members of a suitcase or the like, nevertheless it will be understood that certain phases of my invention have a far wider applicability.

My invention has reference to that type of collapsible brace which is adapted to extend diagonally across the hinge axis of a suitcase or the like when the hinged members thereof are opened, said brace thereby serving to retain such members in relatively opened position.

One of the disadvantages heretofore inherent in braces of this character lies in the fact that the brace must be initially "broken" by actual manipulation thereof before the hinged members can be reclosed. If such "breaking" is not suitably effected, an attempt to close the hinged members will result in great strain upon the hinges, and frequently such hinges are torn out either partially or completely under such circumstances.

On the other hand, it is highly desirable, if not in fact necessary, that the brace be completely open and in complete bracing position as long as the hinged members are desired in open relationship. Without proper and assured bracing, the hinged members are likely to close accidentally and to cause annoyance and damage.

It is an object of my present invention to provide a brace which will not only efficiently hold the hinged members in desired open relationship and against accidental closure, but which is provided with means for causing automatic "breaking" of the brace as soon as pressure is brought to bear upon the members to reclose the latter. In this way, purposeful manipulation of the brace is unnecessary, and as a result accidental impairment of the hinges is entirely prevented.

More particularly, it is an object to provide a toggle brace comprising two mutually pivoted toggle elements, the opposite extremities of which are pivoted respectively to the two hinged members; to provide means for automatically locking said elements in bracing alignment; and to provide means whereby subsequent closure of the hinged members will automatically destroy said alignment to permit such closure.

One feature of my invention lies in providing the toggle elements with portions which overlap when the elements are in bracing alignment; and in providing the locking and automatic "breaking" means in association with such overlapping portions.

Another feature of my invention lies in providing the said means of extremely simple yet highly satisfactory structure, the cost of manufacture being thereby retained at a minimum and the device itself being thereby of extremely compact and efficient nature.

For the attainment of the foregoing objects and such other objects as may hereinafter appear or be pointed out, I have illustrated several forms of my invention in the accompanying drawings wherein—

Figure 1 is a fragmentary perspective view of two mutually hinged members of a suitcase or the like, showing my bracing device in association therewith; the dot and dash lines indicating the relative positions of the parts when the hinged members are in closed relationship;

Figure 2 is a fragmentary cross-sectional view on an enlarged scale taken substantially along the line 2—2 of Figure 1;

Figure 3 is a fragmentary side view of a portion of one of the toggle elements;

Figure 4 is a cross-sectional view taken substantially along the line 4—4 of Figure 3;

Figure 5 is an enlarged side view of the bracing device showing the toggle elements in an intermediate position; the dot and dash lines corresponding to the relationship of parts illustrated in full lines in Figure 1; and Figure 6 is a cross-sectional view taken substantially along the line 6—6 of Figure 5.

For purposes of illustrating the nature of my invention, I have shown two hinged members 10 and 11. The member 10 may be deemed the cover of a suitcase or the like, and the member 11 may be deemed the body portion thereof. The members 10 and 11 are mutually hinged along adjacent edges 12 and 13, one hinge 14 being shown for purposes of more fully disclosing the nature of the hinged relationship.

My bracing device comprises the two juxtaposed toggle elements 15 and 16, these elements having their opposite extremities 17 and 18 pivoted respectively at 19 and 20 to the members 11 and 10. In full lines in Figure 1 the elements 15 and 16 are shown in alignment, the relative positions which they assume during complete and thorough bracing to hold the members 10 and 11 in the opened relationship illustrated.

Each of the elements 15 and 16 is substantially L-shaped, the element 15 being thus provided with an arm or leg 21, and the element 16 being provided with a similar and juxtaposed arm or leg 22. The arms 21 and 22 constitute portions of the elements 15 and 16 respectively, which portions overlap each other when the elements are in their bracing alignment. More particularly, it is to be noted that the arms 21 and 22 extend in the direction of the hinge 14 and that they are mutually pivoted at their extremities by means of the pivot 23.

It is to be noted that the pivot 23 is offset with respect to the aligned elements 15 and 16. In this way, the brace is automatically self-breaking.

To provide for a limitation of relative movement between elements 15 and 16 I provide a struck-up abutment 24 upon the arm 21, this abutment being positioned so that it will be encountered by one edge of the arm 22 when the elements 15 and 16 have been brought into alignment.

To provide for automatic and yieldable locking of the elements 15 and 16 in their bracing relationship, I provide a pair of recesses in the arms 21 and 22 respectively, said recesses being adapted to register when said arms overlap. Referring particularly to Figures 2 and 4 I will point out that the recess 25 in the arm 21 is substantially conical in contour, the narrow end being directed toward the arm 22. The recess 26 in the arm 22 is approximately of the same diameter as the small end of the recess 25.

A rounded latching member is mounted for yieldable projection from the arm 21 toward the arm 22. I have shown a ball 27 mounted in the recess 25 and of larger diameter than the latter. This ball is so constructed and of such a size that a portion thereof will project from the smaller end of the recess 25. A leaf spring 28 is attached to the pivot 23 and serves to bear against the rear side of the ball 27 to constantly urge a portion of the ball out of the recess 25 and toward the arm 22.

When the portions 21 and 22 overlap, the ball 27 accommodates itself in both recesses simultaneously, thereby serving frictionally to retain said recessed portions in overlapping relationship. A slight pressure will, however, cause the ball 27 to retract against the action of the spring 28 to permit a return of the elements 15 and 16 to the collapsed position shown in dot and dash lines in Figure 1.

Although not an essential feature of my invention, I have found it preferable to provide a shallow channel 29 in the arm 22 and communicating with the recess 26, the disposition of this channel being shown most clearly in Figure 5. The channel 29 serves to facilitate the guidance of the ball 27 into engagement with the recess 26 after the bracing device has been opened to its full extent.

It will thus be seen that I have provided a brace of extremely simple yet highly efficient construction. By merely swinging the member 10 upwardly from the closed position to the opened position, the elements 15 and 16 will automatically lock themselves into the alignment shown in Figure 1. This position will be retained until the member 10 is deliberately manipulated to close the same, at which time no independent manipulation of the bracing device is necessary in order to permit such closure.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. A toggle brace for hinged members to secure them against accidental collapsing, comprising a pair of mutually pivoted toggle elements pivoted at opposite extremities to the hinged members respectively and adapted to align with each other to brace the hinged members when the latter are opened, said elements being provided with means whereby the mere subsequent closure pressure against the hinged members will automatically destroy said alignment to permit such closure and folding of the elements into the normally folded position; and automatic means for yieldably holding said elements in alignment.

2. A toggle brace for hinged members to secure them against accidental collapsing, comprising a pair of mutually pivoted toggle elements pivoted at opposite extremities to the hinged members respectively and adapted to align with each other to brace the hinged members when the latter are opened, said elements being provided with means whereby the mere subsequent closure pressure against the hinged members will automatically destroy said alignment to permit such closure and folding of the elements into the normally folded position; and automatic means for yieldably holding said elements in alignment; said last-named means comprising a pair of cooperable latching parts carried by said elements respectively.

3. A toggle brace for hinged members to secure them against accidental collapsing, comprising a pair of mutually pivoted toggle elements pivoted at opposite extremities to the hinged members respectively and adapted to align with each other to brace the hinged members when the latter are opened, said elements being provided with means whereby the mere subsequent closure pressure against the hinged members will automatically destroy said alignment to permit such closure and folding of the elements into the normally folded position; and automatic means for yieldably locking said elements in alignment; said elements including portions which overlap during said alignment, and said last-named means comprising a rounded latching member yieldably projecting from one of said portions toward the other.

4. A toggle brace for hinged members to secure them against accidental collapsing, comprising a pair of mutually pivoted toggle elements pivoted at opposite extremities to the hinged members respectively and adapted to align with each other to brace the hinged members when the latter are opened, said elements being provided with means whereby the mere subsequent closure pressure against the hinged members will automatically destroy said alignment to permit such closure and folding of the elements into the normally folded position; and automatic means for yieldably locking said elements in alignment; said elements including portions which overlap during said alignment, said portions being provided with recesses adapted to register when said portions overlap, and a latching member yieldably projecting from one recess and toward the other portion and adapted to enter the recess of said other portion.

5. A toggle brace for hinged members comprising a pair of mutually pivoted toggle elements pivoted at opposite extremities to the hinged members respectively and adapted to align with each other to brace the hinged members when the latter are opened, and means for automatically yieldably locking said elements in alignment, said means comprising a rounded latching member yieldably carried by one of said elements and adapted to engage with the other element when said to engage with the other element when said elements are aligned, and a spring carried by the mutual pivot of said elements and arranged to urge said latching member constantly into a normal engageable position.

6. A toggle brace for hinged members comprising a pair of mutually pivoted toggle elements pivoted at opposite extremities to the hinged members respectively and adapted to align with each other to brace the hinged members when the latter are opened, said elements including portions which overlap during said alignment, said portions being provided with recesses which register when said portions overlap, and means for automatically yieldably locking said elements in alignment, said means comprising a rounded latching member yieldably projecting from one recess toward the other and adapted to enter said other recess when said portions overlap, said latching member comprising a free spherical member of larger diameter than the recess from which it projects.

7. A toggle brace for hinged members, comprising a pair of juxtaposed L-shaped toggle elements pivoted at the extremities of the stems thereof to the hinged members respectively and mutually pivoted at the ends of the adjacent arms thereof one branch of the L-shaped toggle element extending towards the hinge axis, said arms overlapping when the stems are in alignment to brace the opened hinge members, abutment means on said arms for limiting the relative movement of said elements into said alignment, and yieldable means associated with said arms for holding said elements in said substantially aligned relationship.

8. In combination with a pair of mutually hinged members adapted to open and close with respect to each other, said members when open being angularly disposed, a toggle brace comprising a pair of toggle elements each of which is pivoted at one end to one of said members and at the other end to the other toggle element, said toggle elements being adapted to align with each other when the hinged members are open, the mutual pivot of said toggle elements being off-set toward the hinge axis of said members when said toggle elements are aligned and yieldable means carried by said toggle elements for holding them in alignment so as to brace the said members against accidental closure thereof, whereby pressure upon said hinged members to close the latter, will force said mutual pivot in the direction of said hinge axis to effect an immediate closure of said hinged members.

9. In combination with a pair of mutually hinged members adapted to open and close with respect to each other, said members when open being angularly disposed, a toggle brace comprising a pair of toggle elements each of which is pivoted at one end to one of said members and at the other end to the other toggle element, said toggle elements being adapted to align with each other when the hinged members are open the mutual pivot of said toggle elements being offset toward the hinge axis of said members when said toggle elements are aligned and yieldable means carried by said toggle elements for holding them in alignment so as to brace the said members against accidental closure thereof, whereby pressure upon said hinged members to close the latter will force said mutual pivot in the direction of said hinge axis to effect an immediate closure of said hinged members, said yieldable means comprising a spring, and a ball freely received between one of the elements and the spring and normally moved into engagement with the other element.

10. In combination with a pair of mutually hinged members adapted to open and close with respect to each other, said members when open being angularly disposed, a toggle brace comprising a pair of toggle elements each of which is pivoted at one end to one of said members and at the other end to the other toggle element, said toggle elements being adapted to align with each other when the hinged members are open and each having a portion offset toward the hinge axis of said members when said toggle elements are aligned and which off-set portions are in superposition when such alignment is established, the mutual pivot being located in said off-set portions and yieldable means carried by said toggle elements for holding the members in alignment so as to brace the said members against accidental closure thereof, whereby pressure upon said hinged members to close the latter will force said mutual pivot in the direction of said hinge axis to effect an immediate closure of said hinged members.

11. In a device of the character described, a pair of mutually pivoted toggle elements each having a recess adjacent the pivot said recess being adapted to register when said elements are in alignment, a latching member yieldably projecting from one recess and adapted to enter the other recess when said alignment is established, and a spring carried from the toggle pivot for maintaining the elements in alignment.

12. A pivoted assembly comprising two members, a pivot for pivotally securing adjacent ends of the members together, and means for holding said members in alignment, said means comprising recesses in the ends of said members adapted to be brought into registration when said members are moved to a position of alignment, a ball received in one of said recesses and larger than the other of the recesses, and a leaf spring carried from the pivot and normally in engagement with the ball to force the ball into contact with the perimeter of the other recess so as to yieldably hold the two members in alignment when they have reached this position, and means to limit the pivotal movement of the two members in a direction to a position beyond the dead center position, said means comprising a member struck up from one of the ends and serving to engage the other member.

In witness whereof I have signed this specification this 6th day of September, 1928.

ABRAHAM LEVINE.